US012701104B2

(12) United States Patent
Li et al.

(10) Patent No.: US 12,701,104 B2
(45) Date of Patent: Aug. 4, 2026

(54) COMPREHENSIVE MANAGEMENT METHOD AND APPARATUS FOR APPLICATION TRAFFIC, AND ELECTRONIC DEVICE

(71) Applicant: HANGZHOU PINGPONG INTELLIGENCE TECHNOLOGY CO., LTD., Hangzhou (CN)

(72) Inventors: Jing Li, Hangzhou (CN); Peng Chen, Hangzhou (CN); Zhehui Zhao, Hangzhou (CN); Yu Chen, Hangzhou (CN); Ning Wang, Hangzhou (CN); Shuai Lu, Hangzhou (CN)

(73) Assignee: HANGZHOU PINGPONG INTELLIGENCE TECHNOLOGY CO., LTD., Zhejiang (CN)

( * ) Notice: Subject to any disclaimer, the term of this patent is extended or adjusted under 35 U.S.C. 154(b) by 211 days.

(21) Appl. No.: 18/574,700

(22) PCT Filed: Sep. 13, 2023

(86) PCT No.: PCT/CN2023/118466
§ 371 (c)(1),
(2) Date: Dec. 27, 2023

(87) PCT Pub. No.: WO2024/139412
PCT Pub. Date: Jul. 4, 2024

(65) Prior Publication Data
US 2025/0088488 A1      Mar. 13, 2025

(30) Foreign Application Priority Data
Dec. 28, 2022     (CN) .......................... 202211702806.6

(51) Int. Cl.
*H04L 9/40*          (2022.01)

(52) U.S. Cl.
CPC ...... *H04L 63/0281* (2013.01); *H04L 63/0263* (2013.01)

(58) Field of Classification Search
CPC ............. H04L 63/0281; H04L 63/0263; H04L 67/563; H04L 69/22; H04L 67/56;
(Continued)

(56) References Cited

U.S. PATENT DOCUMENTS 8,615,010 B1     12/2013   Masters
8,959,203 B1 *    2/2015   Miller ..................... H04L 47/00
709/224
(Continued)

FOREIGN PATENT DOCUMENTS

CN          110365699 A      10/2019
CN          112565262 A       3/2021
(Continued)

OTHER PUBLICATIONS

Chinese Office Action received for CN Application No. 202211702806.6 on Jun. 22, 2024, 13 pgs.
(Continued)

*Primary Examiner* — Aftab N. Khan
(74) *Attorney, Agent, or Firm* — Merchant & Gould P.C.

(57)          ABSTRACT

A comprehensive management method and apparatus for application traffic, and an electric device are provided. The method includes: marking a traffic request with a label, and transmitting the traffic request with the label to a user access layer gateway; managing and configuring rules; receiving the traffic request; analyzing the traffic request based on a traffic analyzing rule; identifying and filtering the traffic request based on a traffic filtering rule; performing secondary processing on the traffic request based on a traffic processing rule; and forwarding the traffic request after secondary processing to an application proxy gateway based
(Continued)

on a traffic forwarding rule; and performing an in-traffic proxy and an out-traffic proxy.

12 Claims, 4 Drawing Sheets

(58) Field of Classification Search

CPC ............... H04L 43/026; H04L 41/0677; H04L 41/0893; H04L 43/028; H04L 69/12; H04L 69/14; G06F 9/44526

See application file for complete search history.

(56) References Cited

U.S. PATENT DOCUMENTS

| | | | |
|---|---|---|---|
| 9,148,304 B2 | 9/2015 | Smith | |
| 9,246,986 B1 * | 1/2016 | Ward, Jr. .......... | H04M 15/7652 |
| 10,904,038 B1 | 1/2021 | Haque | |
| 2009/0228418 A1 * | 9/2009 | Ramesh .............. | H04L 63/0218 |
| | | | 706/46 |
| 2011/0179479 A1 | 7/2011 | Tsai | |
| 2020/0045131 A1 * | 2/2020 | Nigam .................... | H04L 67/60 |
| 2022/0311681 A1 | 9/2022 | Palladino | |

FOREIGN PATENT DOCUMENTS

| | | |
|---|---|---|
| CN | 113037830 A | 6/2021 |
| CN | 113542384 A | 10/2021 |
| CN | 113609490 A | 11/2021 |
| CN | 114500309 A | 5/2022 |
| CN | 114900448 A | 8/2022 |
| CN | 115002211 A | 9/2022 |
| CN | 116112384 A | 5/2023 |
| TW | 201124876 A | 7/2011 |

OTHER PUBLICATIONS

European Extended Search Report received for EP Application No. 23822222.8 on Sep. 5, 2025, 10 pgs.

International Search Report and Written Opinion received for PCT Serial No. PCT/CN2023/118466 on Dec. 28, 2022, 20 pgs.

* cited by examiner

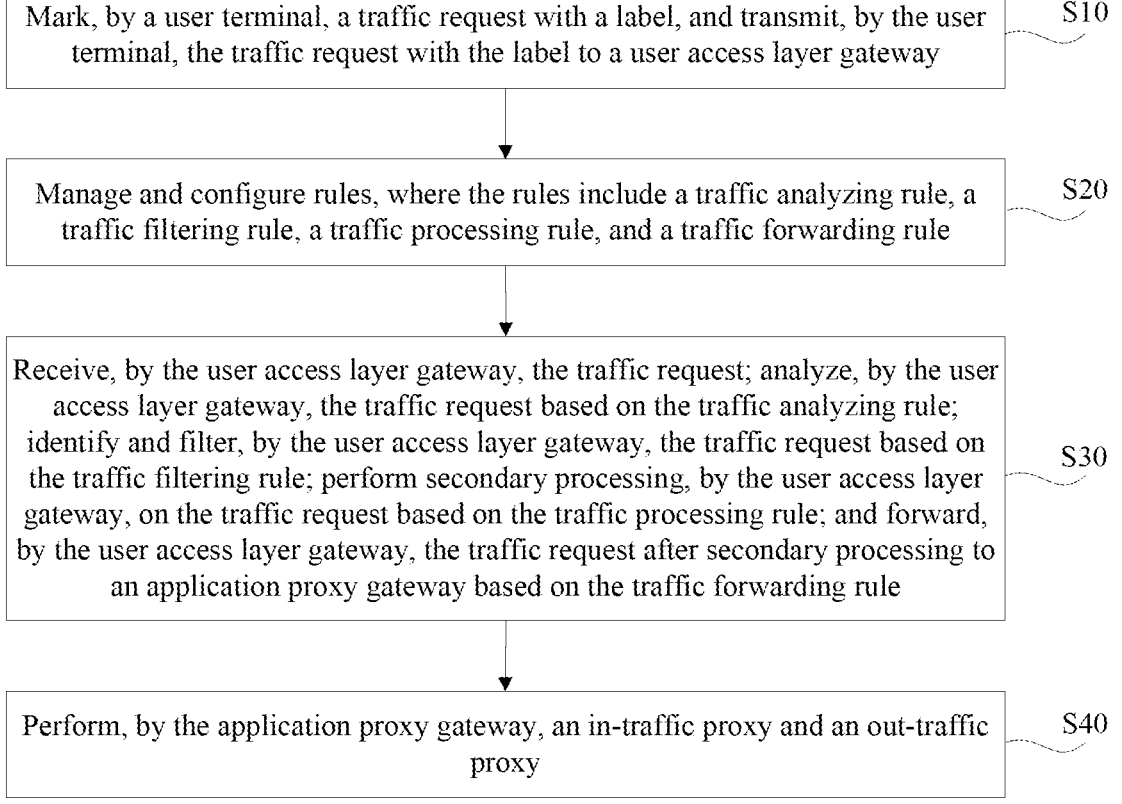

| | |
|---|---|
| Mark, by a user terminal, a traffic request with a label, and transmit, by the user terminal, the traffic request with the label to a user access layer gateway | S10 |
| Manage and configure rules, where the rules include a traffic analyzing rule, a traffic filtering rule, a traffic processing rule, and a traffic forwarding rule | S20 |
| Receive, by the user access layer gateway, the traffic request; analyze, by the user access layer gateway, the traffic request based on the traffic analyzing rule; identify and filter, by the user access layer gateway, the traffic request based on the traffic filtering rule; perform secondary processing, by the user access layer gateway, on the traffic request based on the traffic processing rule; and forward, by the user access layer gateway, the traffic request after secondary processing to an application proxy gateway based on the traffic forwarding rule | S30 |
| Perform, by the application proxy gateway, an in-traffic proxy and an out-traffic proxy | S40 |

Figure 1

COMPREHENSIVE MANAGEMENT METHOD AND APPARATUS FOR APPLICATION TRAFFIC, AND ELECTRONIC DEVICE

CROSS-REFERENCE TO RELATED APPLICATIONS

This application is a National Stage Application of PCT/CN2023/118466, filed Sep. 13, 2023, which claims priority to Chinese Patent Application No. 202211702806.6, filed Dec. 28, 2022 in China, and which applications are incorporated herein by reference. To the extent appropriate, a claim of priority is made to each of the above-disclosed applications.

FIELD

The present disclosure relates to the technical field of computers, and in particular to a comprehensive management method and apparatus for application traffic, and an electric device.

BACKGROUND

Based on a microservice architecture, the complexity of business calls increases exponentially. After performing microserviceization, the structure is clear for development, and it only requires to maintain a small amount of application codes for a single development. However, for operation and maintenance, the microserviceization brings unprecedented challenges. At the resource level, operations are currently performed based on K8S. However, the comprehensive solutions for the application layer management and control related to user traffic request, including flexible traffic scheduling, fault simulation and automatic processing, and traffic mirroring and so on, has not been well implemented, resulting in many problems in traffic management.

Traffic management mainly has the following problems. (1) User traffic requests are distributed to a large number of back-end applications, resulting in complex proxy forwarding configurations at an access layer, and increasing maintenance and management costs and error rates. (2) The requirement for observing user traffic requests is enhanced, requiring tracking and monitoring the traffics. (3) The business side hopes to schedule traffics according to a controllable logic, so that a specific traffic may be scheduled to a predetermined application. (4) In dealing with an emergency, it is required to isolate, limit, and fuse the traffic to avoid large-scale malfunctions. (5) For traffics, the requirements for centralized control include: unified security authentication, traffic replication and cleaning, traffic mirroring and security detection.

SUMMARY

In view of the above problems, a comprehensive management method for application traffic, a comprehensive management apparatus for application traffic, and an electric device are provided according to the present disclosure, for performing comprehensive operation, maintenance and control on application traffic in an east-west direction and a north-south direction and providing one-stop functions, such as switching, fusing, isolation, configuration, limiting, authentication and scheduling, for traffic.

In order to solve the above technical problems, the following technical solutions are provided according to the present disclosure.

In a first aspect, a comprehensive management method for application traffic is provided according to the present disclosure. The method includes: marking, by a user terminal, a traffic request with a label, and transmitting, by the user terminal, the traffic request with the label to a user access layer gateway; managing and configuring rules, where the rules include a traffic analyzing rule, a traffic filtering rule, a traffic processing rule, and a traffic forwarding rule; receiving, by the user access layer gateway, the traffic request; analyzing, by the user access layer gateway, the traffic request based on the traffic analyzing rule; identifying and filtering, by the user access layer gateway, the traffic request based on the traffic filtering rule; performing secondary processing, by the user access layer gateway, on the traffic request based on the traffic processing rule; and forwarding, by the user access layer gateway, the traffic request after secondary processing to an application proxy gateway based on the traffic forwarding rule; and performing, by the application proxy gateway, an in-traffic proxy and an out-traffic proxy.

In an embodiment, the marking, by a user terminal, a traffic request with a label includes: embedding an SDK in a browser and an application program of the user terminal, and adding a Trace ID header to each of traffic requests of the browser and the application program of the user terminal by using the embedded SDK.

In an embodiment, the analyzing the traffic request based on the traffic analyzing rule includes: analyzing the traffic request based on identification and analyzing functions provided by a analyzing plugin for different protocols, where a Trace ID header corresponding to the traffic request and variables and attributes identified by other protocol layers are analyzed; and generating a variable list based on an analyzing result.

In an embodiment, the identifying and filtering the traffic request based on the traffic filtering rule includes: performing calculation and determination on information in a variable list based on the traffic filtering rule to obtain a next-step processing rule for the traffic request.

In an embodiment, the traffic processing rule includes: a traffic security blocking rule, a traffic limiting rule, a traffic fusing rule, a traffic degradation rule, and a traffic replication rule.

In an embodiment, the performing secondary processing on the traffic request includes: performing traffic security blocking on the traffic request based on the traffic security blocking rule, where the traffic security blocking includes real-time blocking on the traffic request.

In an embodiment, the performing secondary processing on the traffic request based on the traffic processing rule includes: performing traffic limiting on the traffic request at a dimension based on the traffic limiting rule.

In an embodiment, the performing secondary processing on the traffic request based on the traffic processing rule includes: performing fusing on a traffic request meeting a condition based on the traffic fusing rule.

In an embodiment, the performing secondary processing on the traffic request based on the traffic processing rule includes: performing replication and simulation on the traffic request based on the traffic replication rule, where the replication and simulation is performed by replicating the traffic request and forwarding the replicated traffic request to a bypass proxy gateway.

In an embodiment, the performing, by the application proxy gateway, an in-traffic proxy includes: performing protocol analyzing on a traffic forwarded by the user access layer gateway or a traffic remotely invoked by an application, performing traffic limiting, degradation or fusing on the traffic based on a protocol analyzing result, and forwarding the traffic after traffic limiting, degradation or fusing to an application program.

In an embodiment, the performing, by the application proxy gateway, an out-traffic proxy includes: performing protocol analyzing on a call by an application program to another application or on an external call by an application program, performing traffic limiting, degradation or fusing on a traffic based on a protocol analyzing result, and forwarding the traffic after traffic limiting, degradation or fusing to an internal proxy gateway, a database, a cache or an external call.

In a second aspect, a comprehensive management apparatus for application traffic is provided according to the present disclosure. The comprehensive management apparatus for application traffic includes: a request traffic marking module, a rule management and configuration module, a user access layer gateway module, and multiple application proxy gateway modules. The request traffic marking module is configured to mark a traffic request with a label at a user terminal, where the user terminal transmits the traffic request with the label to a user access layer gateway. The rule management and configuration module is configured to manage and configure rules, where the rules include a traffic analyzing rule, a traffic filtering rule, a traffic processing rule, and a traffic forwarding rule. The user access layer gateway module is configured to: receive the traffic request; analyze the traffic request based on the traffic analyzing rule; identify and filter the traffic request based on the traffic filtering rule; perform secondary processing on the traffic request based on the traffic processing rule; and forward the traffic request after secondary processing to an application proxy gateway based on the traffic forwarding rule. The application proxy gateway modules are configured to perform an in-traffic proxy and an out-traffic proxy.

In a third aspect, an electric device is provided according to the present disclosure. The electric device includes: a memory and a processor. The memory stores at least computer-executable instructions. The processor is configured to, when executing the computer-executable instructions stored in the memory, perform the comprehensive management method for application traffic described above.

In a fourth aspect, a computer-readable storage medium is provided according to the present disclosure. The computer-readable storage medium stores computer-executable instructions. The computer-executable instructions, when executed by a processor, cause the processor to perform the comprehensive management method for application traffic described above.

In summary, compared to the conventional technology, the comprehensive management method for application traffic, the comprehensive management apparatus for application traffic, and the electric device according to the present disclosure have at least the following beneficial effects.

(1) The request traffic is marked with a label, and subsequent analyzing and processing are performed on the request traffic with the label, so that a detailed calling chain of the request traffic can be tracked, thereby performing efficient troubleshooting based on the data of the calling chain for service anomalies or faults.

(2) Dynamic traffic limiting is performed based on a configurable rule, thereby coping with a sudden traffic and eliminating or smoothing out traffic peaks to ensure the stability of a backend service system.

(3) A dynamically pluggable analyzing plugin is used according to the present disclosure, so that common application protocols, such as HTTP and GRPC, can be analyzed, and any other application protocols can be analyzed by running plugins written in various other programming languages (such as Rust, Python, Golang, JavaScript, and C++).

(4) Rules may be analyzed and executed by using a rule engine, so that various complex rules can be powerfully and flexibly configured.

BRIEF DESCRIPTION OF THE DRAWINGS

In order to more clearly describe the technical solutions in the embodiments of the present disclosure or the technical solutions in the conventional technology, drawings to be used in the description of the embodiments of the present disclosure or the conventional technology are briefly described hereinafter. It is apparent that the drawings described below are merely used for describing the embodiments of the present disclosure, and those skilled in the art may obtain other drawings according to the drawings without any creative effort.

FIG. 1 is a flow chart of a comprehensive management method for application traffic according to an embodiment of the present disclosure;

DETAILED DESCRIPTION

Figure 2:
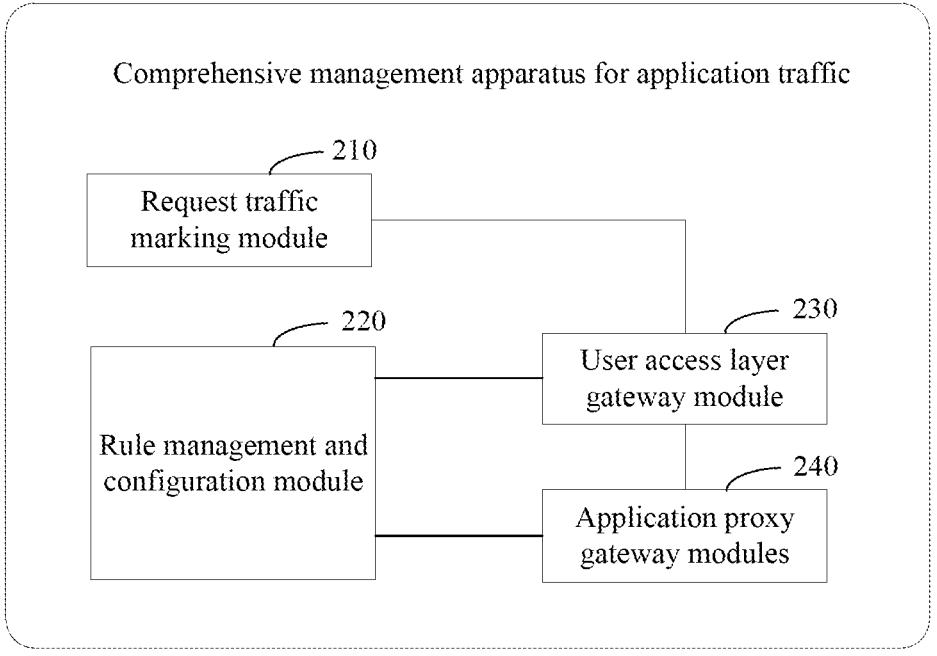
FIG. 2 is a schematic structural diagram of a comprehensive management apparatus for application traffic according to an embodiment of the present disclosure.

The technical solutions according to the embodiments of the present disclosure will be described clearly and completely below in combination with the drawings in the embodiments of the present disclosure. It is apparent that the described embodiments are only a part of the embodiments of the present disclosure, rather than all of the embodiments. Based on the embodiments of the present disclosure, all the other embodiments obtained by those skilled in the art without creative working will fall within the scope of the present disclosure.

Reference is made to FIG. 1, which shows a flow chart of a comprehensive management method for application traffic. A comprehensive management method for application traffic according to an embodiment of the present disclosure includes following steps S10 to S40.

In S10, a user terminal marks a traffic request with a label, and transmits the traffic request with the label to a user access layer gateway.

In an embodiment, the traffic request may be marked with the label by adding a Trace ID header to a traffic request from an application, such as a browser and an application program, on the user terminal.

In an embodiment, an SDK may be embedded in an application, such as a browser and an application program, on the user terminal, and then a Trace ID header is added to a traffic request from the application by using the embedded SDK. For example, for a browser, a mobile APP, Ding Talk, WeChat or the like on the user terminal, a traffic request is marked with a Trace ID header using the SDK based on the HTTP protocol.

In S20, rules are managed and configured. The rules include a traffic analyzing rule, a traffic filtering rule, a traffic processing rule, and a traffic forwarding rule.

In implementing the present disclosure, rules may be flexibly configured according to actual requirements.

The traffic processing rule, also called as a request processing rule, is used for performing secondary processing on a traffic request. In an embodiment, the traffic processing rule includes but is not limited to: a traffic security blocking rule for performing traffic security blocking, a traffic limiting rule for performing traffic limiting, a traffic fusing rule for performing traffic fusing, a traffic degradation rule for performing traffic degradation, and a traffic replication rule for performing traffic replication and simulation.

The traffic analyzing rule, the traffic filtering rule and the traffic forwarding rule are configured respectively for performing analyzing, performing identification and filtering, and performing forwarding on a traffic request.

In S30, the user access layer gateway receives the traffic request, analyzes the traffic request based on the traffic analyzing rule, identifies and filters the traffic request based on the traffic filtering rule, performs secondary processing on the traffic request based on the traffic processing rule, and forwards the traffic request after secondary processing to an application proxy gateway based on the traffic forwarding rule.

The user access layer gateway is configured to manage a user access traffic, that is, manage a north-south traffic.

In an embodiment, the traffic request may be analyzed based on the traffic analyzing rule by: analyzing the traffic request based on identification and analyzing functions provided by a analyzing plugin for different protocols, where a Trace ID header corresponding to the traffic request and variables and attributes (such as HTTP cookies, HTTP headers, URL request parameters, and a requested message content) identified by other protocol layers are analyzed; and generating a variable list based on an analyzing result.

Based on the above embodiment, it should be understood that the traffic analyzing rule may be understood as an analyzing rule reflected by the identification and analyzing functions provided by the analyzing plugin for different protocols.

The analyzing plugin may be implemented, but is not limited to, based on a WebAssembly specification, and may be developed in multiple programming languages. An application protocol may be customized and analyzed with an analyzing plugin.

For example, based on the WebAssembly specification, a plugin system for implementing an analyzing plugin may be realized with the following steps a to f.

In step a, functions of a plugin is abstracted, and an interface specification is defined. Core interfaces mainly include: a data receiving interface, a data conversion interface, a data encryption and decryption interface, a data decompression interface, and a data encoding and decoding interface.

In step b, modules of the plugin in operation are developed based on the WebAssembly specification. The modules may be developed, but not limited to, by a Rust language.

In step c, analyzing plugins having identification and analyzing functions for different protocols are developed with languages (such as Rust, Python, and Golang) that support the WebAssembly specification.

In step d, plugin files of the analyzing plugins are uploaded to a file server, access addresses of the plugin files are obtained, and the access addresses of the plugin files are configured in corresponding platforms.

In step e, a plugin operation module reads configuration information, a plugin is dynamically downloaded and loaded based on an access address of the plugin in the configuration information.

In step f, when traffic data arrives, the plugin operation module calls an interface to process the traffic data based on the defined interface specification, processes an output result, and transmits the processed output result to a platform.

Based on the above steps, the obtained plugin system is dynamically pluggable and has good expansibility.

In an embodiment, the traffic request may be identified and filtered based on the traffic filtering rule by: performing calculation and determination on information in a variable list based on the traffic filtering rule to obtain a next-step processing rule for the traffic request. For example, application layer cleaning may be performed on traffic with the comprehensive management method for application traffic, such as filtering traffic requests with excessively large HTTP headers.

The secondary processing performed on the traffic request includes, but not limited to, any one or more of traffic security blocking, traffic limiting, fusing, and replication and simulation.

In an embodiment, the traffic security blocking is performed on the traffic request by: performing traffic security blocking on the traffic request based on a traffic security blocking rule. The traffic security blocking includes real-time blocking for the traffic request. For example, a traffic request may be blocked based on a black-and-white list of request IPs, or a traffic request may be forwarded to a secure honeypot. Alternatively, security risk determination may be performed on content of a traffic request based on a security scoring rule, and the traffic request is blocked in a case of a low security score.

Based on a traffic limiting rule, traffic limiting with different dimensions are supported. In an embodiment, traffic limiting may be performed on a traffic request by: performing traffic limiting on the traffic request at a dimension based on the traffic limiting rule.

The traffic limiting may be performed with a distributed bucket traffic limiting algorithm implemented based on Redis, quickly and efficiently determining whether a traffic flow is speeding, greatly increasing a buffer space of the traffic after the traffic flow speeds, effectively protecting backend back-end services against sudden traffics, and thereby smoothly forwarding an actual request traffic to the back-end services. For example, the number of requests per second from a single request IP, a group of request IPs or a specific request IP may be limited, the number of requests per second from a single user ID, a group of user IDs or a specific user ID may be limited, the number of requests per second from a certain region may be limited, and the number of requests per second from a single URL, a group of URLs or a specific URL may be limited.

In an embodiment, fusing may be performed on a traffic request by: performing fusing on a traffic request meeting a condition based on a traffic fusing rule. For example, when the traffic reaches a certain amount, a certain traffic request or a backend service is fused based on a fusing rule, thereby protecting traffic requests from important users and core backend services, greatly improving the robustness of the system, and ensuring that the system may operate normally under an unexpected service pressure. For example, a URL, with a response time period longer than 10 seconds for three consecutive requests, may be fused for 60 s.

In an embodiment, replication and simulation may be performed on a traffic request by: replicating the traffic request based on a traffic replication rule, and forwarding the replicated traffic request to a bypass proxy gateway. For example, the traffic request may be replicated to a testing application proxy gateway, so that a real request traffic in a production environment is simulated to a maximum extent, the testing environment receives traffic similar to the traffic in the production environment, thereby avoiding the problem of low testing coverage or low BUG detection rate caused by differences between the testing environment and the production environment. Alternatively, the traffic request may be replicated to a content security scanning gateway, thereby performing a real-time security scanning on the content of the traffic request without affecting the performance of the production environment.

In S40, the application proxy gateway performs an in-traffic proxy and an out-traffic proxy.

The application proxy gateway manages traffic between applications, that is, east-west traffic.

In an embodiment, the application proxy gateway may perform the in-traffic proxy by: performing protocol analyzing on a traffic forwarded by the user access layer gateway or a traffic remotely invoked by an application, performing traffic limiting, degradation or fusing on the traffic based on a protocol analyzing result, and forwarding the traffic after traffic limiting, degradation or fusing to an application program. By performing the in-traffic proxy, a protocol may be identified and converted, and applications based on different remote calling protocols may be deployed in a same application cluster, thereby realizing heterogeneous mixed deployment.

In an embodiment, the application proxy gateway may perform the out-traffic proxy by: performing protocol analyzing on a call by an application program to another application or on an external call by an application program, performing traffic limiting, degradation or fusing on a traffic based on a protocol analyzing result, and forwarding the traffic after traffic limiting, degradation or fusing to an internal proxy gateway, a database, a cache or an external call.

For the traffic limiting, the number of calls per second of a single user ID, a group of user IDs or a certain user ID may be limited, or the number of calls per second of a single function, a group of functions or a certain function may be limited. For degradation, based on a state (including traffic pressure, performance, and response time) of an application and a predetermined degradation rule, functions of the application is gradually turned off from edge functions until the state of the application meets the predetermined degradation rule.

In the comprehensive management method for application traffic according to the present disclosure, the step S20 in which rules are managed and configured serves as a bypass step for other steps in the method, providing support for the rules required by steps S30 and S40 in the method. In actual applications, the order in which steps S20 and S10 are performed is not limited.

In summary, with the comprehensive management method for application traffic according to the embodiments of the present disclosure, comprehensive operation, maintenance and control are performed on application traffic in an east-west direction and a north-south direction, and one-stop functions, such as switching, fusing, isolation, configuration, limiting, authentication and scheduling, for traffic are provided.

According to the present disclosure, the request traffic is marked with a label, and subsequent analyzing and processing are performed on the request traffic with the label, so that a detailed calling chain of the request traffic can be tracked, thereby performing efficient troubleshooting based on the data of the calling chain for service anomalies or faults. Dynamic traffic limiting is performed based on a configurable rule, thereby coping with a sudden traffic and eliminating or smoothing out traffic peaks to ensure the stability of a backend service system. In addition, with the dynamically pluggable analyzing plugin in the present disclosure, common application protocols, such as HTTP and GRPC, can be analyzed, and any other application protocols can be analyzed by running plugins written in various other programming languages (such as Rust, Python, Golang, JavaScript, and C++). Furthermore, rules may be analyzed and executed by using a rule engine, so that various complex rules can be powerfully and flexibly configured.

Corresponding to the comprehensive management method for application traffic, a comprehensive management apparatus for application traffic is further provided according to the present disclosure. FIG. 2 shows a structure of the comprehensive management apparatus for application traffic. The comprehensive management apparatus for application traffic includes: a request traffic marking module 210, a rule management and configuration module 220, a user access layer gateway module 230, and multiple application proxy gateway modules 240.

The request traffic marking module 210 is configured to mark a traffic request with a label at a user terminal. The user terminal transmits the traffic request with the label to a user access layer gateway.

The rule management and configuration module 220 is configured to manage and configure rules. The rules include a traffic analyzing rule, a traffic filtering rule, a traffic processing rule, and a traffic forwarding rule.

The user access layer gateway module 230 is configured to: receive the traffic request; analyze the traffic request based on the traffic analyzing rule; identify and filter the traffic request based on the traffic filtering rule; perform secondary processing on the traffic request based on the traffic processing rule; and forward the traffic request after secondary processing to an application proxy gateway based on the traffic forwarding rule. The user access layer gateway module 230 is configured to manage user access traffic, that is, manage north-south traffic.

The application proxy gateway modules 240 are configured to perform an in-traffic proxy and an out-traffic proxy. The application proxy gateway modules 240 are configured to manage traffic between applications, that is, east-west traffic.

In an embodiment, the request traffic marking module 210 may be configured to mark the traffic request with the label by adding a Trace ID header to a traffic request from an application, such as a browser and an application program, on the user terminal.

In an embodiment, an SDK may be embedded in an application, such as a browser and an application program, on the user terminal, and then a Trace ID header is added to a traffic request from the application by using the embedded SDK. For example, for a browser, a mobile APP, Ding Talk, WeChat or the like on the user terminal, a traffic request is marked with a Trace ID header using the SDK based on the HTTP protocol.

In implementing the present disclosure, the rule management and configuration module 220 may be configured to flexibly configure rules according to actual requirements.

The traffic processing rule, also called as a request processing rule, is used for performing secondary processing on a traffic request. In an embodiment, the traffic processing rule includes but is not limited to: a traffic security blocking rule for performing traffic security blocking, a traffic limiting rule for performing traffic limiting, a traffic fusing rule for performing traffic fusing, a traffic degradation rule for performing traffic degradation, and a traffic replication rule for performing traffic replication and simulation.

The traffic analyzing rule, the traffic filtering rule and the traffic forwarding rule are configured respectively for performing analyzing, performing identification and filtering, and performing forwarding on a traffic request.

In an embodiment, the user access layer gateway module 230 may be configured to analyze the traffic request based on the traffic analyzing rule by: analyzing the traffic request based on identification and analyzing functions provided by a analyzing plugin for different protocols, where a Trace ID header corresponding to the traffic request and variables and attributes (such as HTTP cookies, HTTP headers, URL request parameters, and a requested message content) identified by other protocol layers are analyzed; and generating a variable list based on an analyzing result.

Based on the above embodiment, it should be understood that the traffic analyzing rule may be understood as an analyzing rule reflected by the identification and analyzing functions provided by the analyzing plugin for different protocols.

The analyzing plugin may be implemented, but is not limited to, based on a WebAssembly specification, and may be developed in multiple programming languages. An application protocol may be customized and analyzed with an analyzing plugin.

For example, based on the WebAssembly specification, a plugin system for implementing an analyzing plugin may be realized with the following steps a to f.

In step a, functions of a plugin is abstracted, and an interface specification is defined. Core interfaces mainly include: a data receiving interface, a data conversion interface, a data encryption and decryption interface, a data decompression interface, and a data encoding and decoding interface.

In step b, modules of the plugin in operation are developed based on the WebAssembly specification. The modules may be developed, but not limited to, by a Rust language.

In step c, analyzing plugins having identification and analyzing functions for different protocols are developed with languages (such as Rust, Python, and Golang) that support the WebAssembly specification.

In step d, plugin files of the analyzing plugins are uploaded to a file server, access addresses of the plugin files are obtained, and the access addresses of the plugin files are configured in corresponding platforms.

In step e, a plugin operation module reads configuration information, a plugin is dynamically downloaded and loaded based on an access address of the plugin in the configuration information.

In step f, when traffic data arrives, the plugin operation module calls an interface to process the traffic data based on the defined interface specification, processes an output result, and transmits the processed output result to a platform.

Based on the above steps, the obtained plugin system is dynamically pluggable and has good expansibility.

In an embodiment, the user access layer gateway module 230 may be configured to identify and filter the traffic request based on the traffic filtering rule by: performing calculation and determination on information in a variable list based on the traffic filtering rule to obtain a next-step processing rule for the traffic request. For example, application layer cleaning may be performed on traffic with the comprehensive management method for application traffic, such as filtering traffic requests with excessively large HTTP headers.

The secondary processing performed by the user access layer gateway module 230 on the traffic request includes, but not limited to, any one or more of traffic security blocking, traffic limiting, fusing, and replication and simulation.

In an embodiment, the user access layer gateway module 230 may be configured to perform the traffic security blocking on the traffic request by: performing traffic security blocking on the traffic request based on a traffic security blocking rule. The traffic security blocking includes real-time blocking for the traffic request. For example, a traffic request may be blocked based on a black-and-white list of request IPs, or a traffic request may be forwarded to a secure honeypot. Alternatively, security risk determination may be performed on content of a traffic request based on a security scoring rule, and the traffic request is blocked in a case of a low security score.

Based on a traffic limiting rule, traffic limiting with different dimensions are supported. In an embodiment, the user access layer gateway module 230 may be configured to perform traffic limiting on a traffic request by: performing traffic limiting on the traffic request at a dimension based on the traffic limiting rule.

The traffic limiting may be performed with a distributed bucket traffic limiting algorithm implemented based on Redis, quickly and efficiently determining whether a traffic flow is speeding, greatly increasing a buffer space of the traffic after the traffic flow speeds, effectively protecting backend back-end services against sudden traffics, and thereby smoothly forwarding an actual request traffic to the back-end services. For example, the number of requests per second from a single request IP, a group of request IPs or a specific request IP may be limited, the number of requests per second from a single user ID, a group of user IDs or a specific user ID may be limited, the number of requests per second from a certain region may be limited, and the number of requests per second from a single URL, a group of URLs or a specific URL may be limited.

In an embodiment, the user access layer gateway module 230 may be configured to perform fusing on a traffic request by: performing fusing on a traffic request meeting a condition based on a traffic fusing rule. For example, when the traffic reaches a certain amount, a certain traffic request or a backend service is fused based on a fusing rule, thereby protecting traffic requests from important users and core backend services, greatly improving the robustness of the system, and ensuring that the system may operate normally under an unexpected service pressure. For example, a URL, with a response time period longer than 10 seconds for three consecutive requests, may be fused for 60 s.

In an embodiment, the user access layer gateway module 230 may be configured to perform replication and simulation on a traffic request by: replicating the traffic request based on a traffic replication rule, and forwarding the replicated traffic request to a bypass proxy gateway. For example, the traffic request may be replicated to a testing application proxy gateway, so that a real request traffic in a production environment is simulated to a maximum extent, the testing environment receives traffic similar to the traffic in the production environment, thereby avoiding the problem of low testing coverage or low BUG detection rate caused by differences between the testing environment and the production environment. Alternatively, the traffic request may be replicated to a content security scanning gateway, thereby performing a real-time security scanning on the content of the traffic request without affecting the performance of the production environment.

In an embodiment, the application proxy gateway modules 240 may be configured to perform the in-traffic proxy by: performing protocol analyzing on a traffic forwarded by the user access layer gateway or a traffic remotely invoked by an application, performing traffic limiting, degradation or fusing on the traffic based on a protocol analyzing result, and forwarding the traffic after traffic limiting, degradation or fusing to an application program. By performing the in-traffic proxy, a protocol may be identified and converted, and applications based on different remote calling protocols may be deployed in a same application cluster, thereby realizing heterogeneous mixed deployment.

In an embodiment, the application proxy gateway modules 240 may be configured to perform the out-traffic proxy by: performing protocol analyzing on a call by an application program to another application or on an external call by an application program, performing traffic limiting, degradation or fusing on a traffic based on a protocol analyzing result, and forwarding the traffic after traffic limiting, degradation or fusing to an internal proxy gateway, a database, a cache or an external call.

For the traffic limiting, the number of calls per second of a single user ID, a group of user IDs or a certain user ID may be limited, or the number of calls per second of a single function, a group of functions or a certain function may be limited. For degradation, based on a state (including traffic pressure, performance, and response time) of an application and a predetermined degradation rule, functions of the application is gradually turned off from edge functions until the state of the application meets the predetermined degradation rule.

Figure 3:
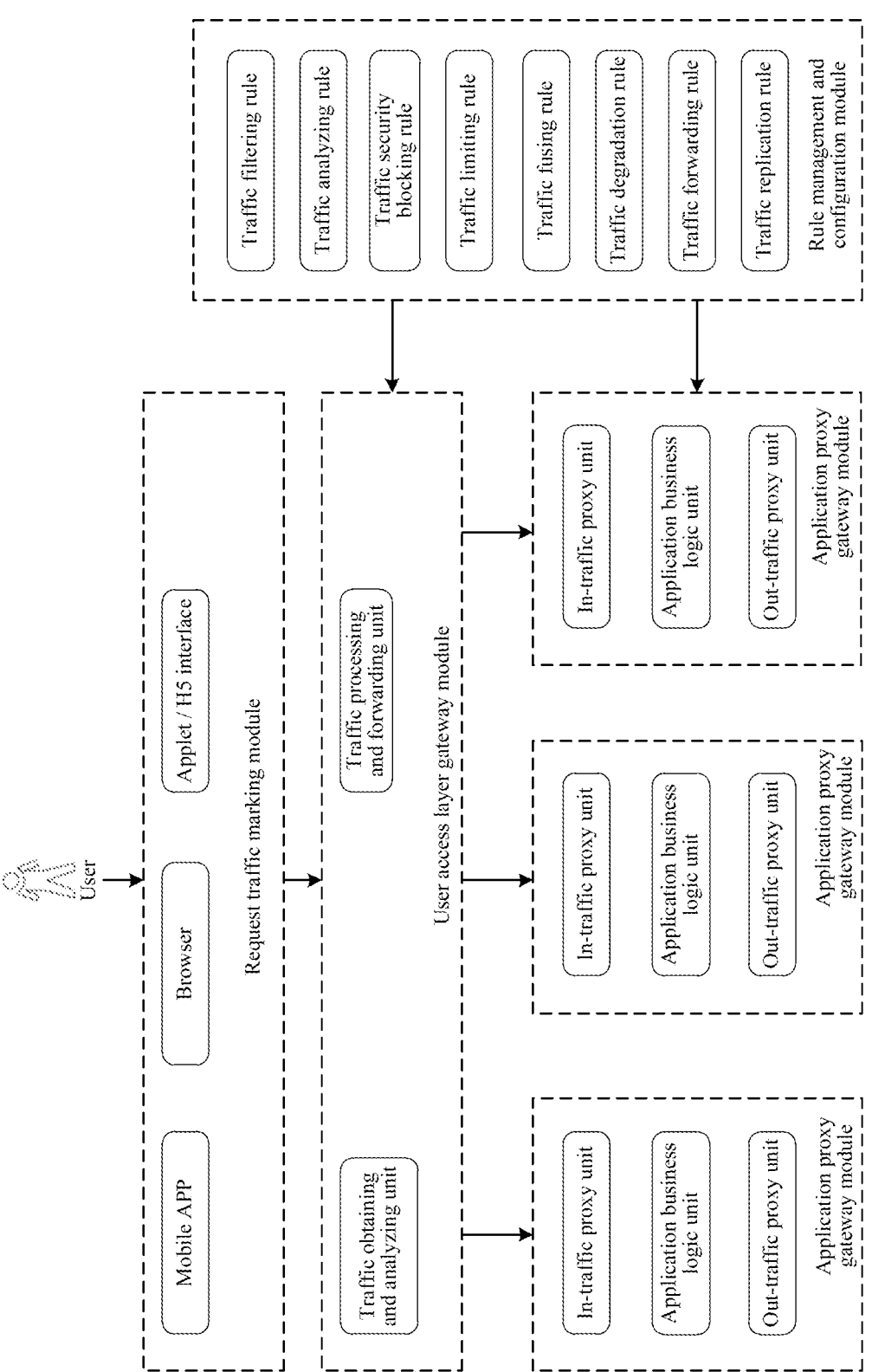
FIG. 3 is a schematic diagram of an exemplary architecture of a comprehensive management apparatus for application traffic according to an embodiment of the present disclosure.

Based on the above descriptions, an exemplary architecture of a comprehensive management apparatus for application traffic is further provided according to an embodiment of the present disclosure, as shown in FIG. 3.

In the comprehensive management apparatus for application traffic according to the present disclosure, the rule management and configuration module 220 serves as a bypass module for other modules in the apparatus, and provides support for the rules required by the user access layer gateway module 230 and multiple application proxy gateway modules 240 in the apparatus. In actual applications, the order in which operations performed by the rule management and configuration module 220 and the request traffic marking module 210 is not limited.

In summary, with the comprehensive management apparatus for application traffic according to the embodiments of the present disclosure, comprehensive operation, maintenance and control are performed on application traffic in an east-west direction and a north-south direction, and one-stop functions, such as switching, fusing, isolation, configuration, limiting, authentication and scheduling, for traffic are provided.

According to the present disclosure, the request traffic is marked with a label, and subsequent analyzing and processing are performed on the request traffic with the label, so that a detailed calling chain of the request traffic can be tracked, thereby performing efficient troubleshooting based on the data of the calling chain for service anomalies or faults. Dynamic traffic limiting is performed based on a configurable rule, thereby coping with a sudden traffic and eliminating or smoothing out traffic peaks to ensure the stability of a backend service system. In addition, with the dynamically pluggable analyzing plugin in the present disclosure, common application protocols, such as HTTP and GRPC, can be analyzed, and any other application protocols can be analyzed by running plugins written in various other programming languages (such as Rust, Python, Golang, JavaScript, and C++). Furthermore, rules may be analyzed and executed by using a rule engine, so that various complex rules can be powerfully and flexibly configured.

Figure 4:
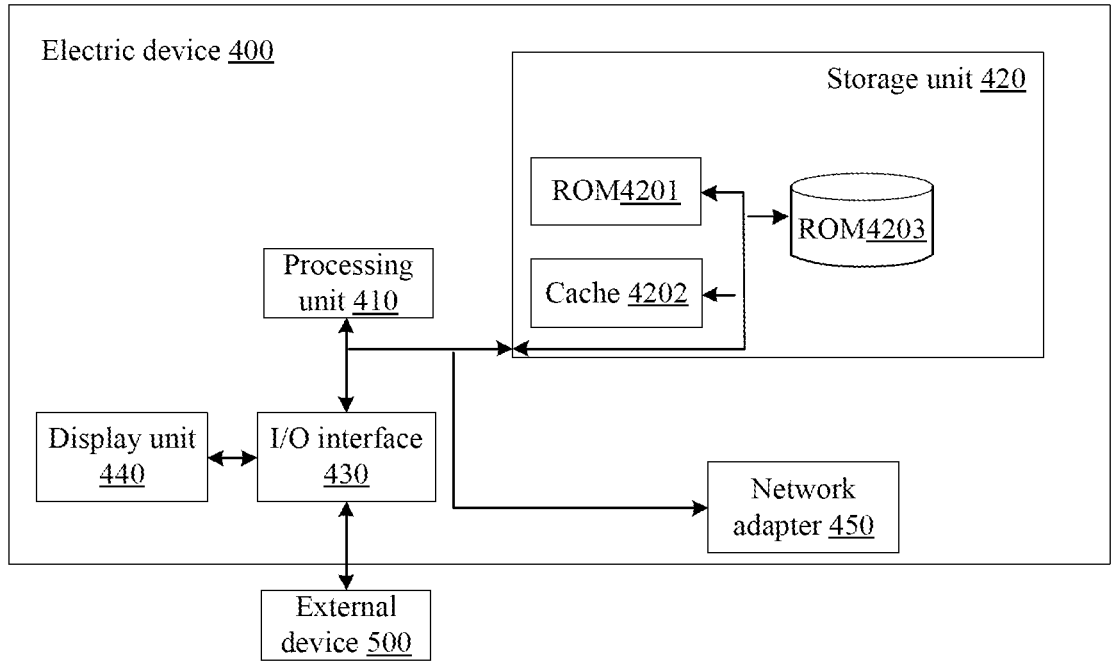
FIG. 4 is a schematic structural diagram of an electric device according to an embodiment of the present disclosure.

An electric device is further provided according to an embodiment of the present disclosure. As shown in FIG. 4, the electronic device 400 may include, but is not limited to: at least a processing unit 410, a storage unit 420, a bus connecting different components (including the storage unit 420 and the processing unit 410), an I/O interface 430, a display unit 440, and the like. The storage unit 420 stores computer-executable instructions. The computer-executable instructions may be implemented in a form of computer program codes. The computer program codes may be executed by the processing unit 410. The processing unit 410, when executing the computer-executable instructions stored in the storage unit 420, performs the comprehensive management method for application traffic described in the above method embodiments of the present disclosure.

The processing unit 410 may be implemented by a processor, and the storage unit 420 may be implemented by a memory.

The storage unit 420 may include a readable medium in a form of a volatile memory unit, such as a random-access memory (RAM) 4201 and/or a cache storage unit 4202, and may further include a read-only memory (ROM) 4203. The storage unit 420 may further include a program/utility with a set of (at least one) program modules. The program modules include, but are not limited to, an operating device, one or more application programs, other program modules and program data, and each or some combination of which may include an implementation of a network environment.

The bus may have one or more of several types of bus structures, including a storage unit bus or a storage unit controller, a peripheral bus, a graphics acceleration port, a processing unit, or a local bus using any of the several types of bus structures.

The electronic device 400 may communicate with one or more external devices 500 (such as a keyboard, a pointing device, and a Bluetooth device), and may communicate with one or more devices with which the user may interact with the electronic device 400, and/or may communicate with a device (such as, a router and a modem) through which the electronic device 400 may communicate with one or more other computing devices. The above communications may be performed via the input/output (I/O) interface. In addition, the electronic device 400 may communicate with one or more networks (such as a local area network (LAN), a wide area network (WAN), and/or a public network (Internet)) through a network adapter 450. The network adapter 450 may communicate with other modules of the electronic device 400 through the bus. The electronic device 400 displays information through the display unit 440. It should be understood that, although not shown in FIG. 4, other hardware and/or software modules may be used in conjunction with the electronic device 400. The hardware and/or software modules include but not limited to: microcode, a device driver, a redundant processing unit, an external disk driving array, a RAID device, a tape driver, and a data backup and storage device.

From the descriptions of the above embodiments, it is easy be understood for those skilled in the art that the exemplary embodiments in the present disclosure may be implemented by software, and may further be implemented by software in conjunction with necessary hardware. Therefore, the technical solutions according to the embodiments of the present disclosure may be implemented as a software product. The software product may be stored in a computer-readable storage medium (such as a CD-ROM, a USB flash drive, and a portable hard drive) or a network, and the software product includes several instructions based on which a computer device (which may be a personal computer, a server, or a network device) may perform the comprehensive management method for application traffic according to the present disclosure.

A computer-readable storage medium is further provided according to the present disclosure. The computer-readable storage medium stores computer-executable instructions. The computer-executable instructions, when executed by a processor, cause the processor to perform the comprehensive management method for application traffic according to the embodiments of the present disclosure.

The computer-executable instructions may be implemented in a form of a computer program.

The computer program is stored in at least one computer-readable medium. The computer-readable medium may be a readable signal medium or a readable storage medium. The readable storage medium may include, but is not limited to, an electronic, magnetic, optical, electromagnetic, infrared, or semiconductor system, apparatus or device, or any suitable combination of thereof. The readable storage medium, for example (a non-exhaustive list), includes an electrical connection based on one or more wires, a portable computer disk, a hard drive, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of thereof.

The computer-readable storage medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The readable storage medium may be any readable medium other than the readable storage medium and can send, propagate or transmit programs to be used by or with an instruction execution system, apparatus or device. The program codes stored in the readable storage medium may be transmitted via any proper medium including but not limited to: wireless, wired, optical fiber cable, radio frequency (RF), or any suitable combination of the foregoing.

Computer program codes for performing operations of the embodiments in the present disclosure may be written in one or more programming languages, or a combination of the foregoing. The program codes may be executed entirely on a user's computing device, or be executed partly on the user's computing device, or be executed as a stand-alone software package, or be executed partly on the user's computing device and partly on a remote computing device, or be executed entirely on the remote computing device or server. In a case that the execution of the program code involves a remote computing device, the remote computing device may be connected to a user's computing device via any kind of network, including a local area network (LAN) or a wide area network (WAN), or may be connected to an external computing device (for example, via an Internet providing by an Internet service provider).

In summary, the present disclosure may be implemented in hardware, or in software modules operating on one or more processors, or in a combination thereof. Those skilled in the art should understand that a general-purpose data processing device, such as a microprocessor or a digital signal processor (DSP) may be used in practice to perform some or all of the functions of some or all of the components according to the embodiments of the present disclosure. The present disclosure may further be implemented as a device or an apparatus program (such as, a computer program and a computer program product) for performing part or all of the methods described herein. The program implementing the present disclosure may be stored on a computer-readable medium, or may be in a form of one or more signals. The signals may be downloaded from an internet site, or provided on a carrier signal, or in any other form.

It should be noted that the embodiments in this specification are described in a progressive manner. Each of the embodiments emphasizes the differences from others, and the same or similar parts among the embodiments may be referred to each other.

For convenience of description, the system or apparatus is described respectively based on functions divided into various modules or units. Apparently, the functions of each of the modules may be implemented in the same one or multiple software and/or hardware in implementing the present disclosure.

Finally, it should be further noted that the terms of "include", "comprise" or any other variants thereof are intended to be non-exclusive. Therefore, a process, method, article or device including a series of elements includes not only these elements but also other elements that are not clearly enumerated, or further includes elements inherent in the process, method, article or device. Unless expressively limited, the statement "including a . . . " does not exclude the case that other similar elements may exist in the process, method, article or device including the series of elements.

It should be understood that the exemplary embodiments described herein are illustrative rather than restrictive. Although one or more embodiments of the present disclosure are described in conjunction with the attached drawings, it should be understood by those in the art that modifications in forms and details may be made without deviating from the spirit and scope of the present disclosure as defined by the attached claims.

The invention claimed is:

1. A comprehensive management method for application traffic, comprising:

marking, by a user terminal, a traffic request with a label, and transmitting, by the user terminal, the traffic request with the label to a user access layer gateway;

managing and configuring rules, wherein the rules comprise a traffic analyzing rule, a traffic filtering rule, a traffic processing rule, and a traffic forwarding rule;

receiving, by the user access layer gateway, the traffic request; analyzing, by the user access layer gateway, the traffic request based on the traffic analyzing rule; identifying and filtering, by the user access layer gateway, the traffic request based on the traffic filtering rule; performing processing, by the user access layer gateway, on the traffic request based on the traffic processing rule; and forwarding, by the user access layer gateway, the traffic request after processing to an application proxy gateway based on the traffic forwarding rule; and performing, by the application proxy gateway, an in-traffic proxy and an out-traffic proxy;

wherein the analyzing the traffic request based on the traffic analyzing rule comprises:

analyzing the traffic request based on identification and analyzing functions provided by a analyzing plugin for different protocols, wherein a Trace ID header corresponding to the traffic request and variables and attributes identified by other protocol layers are analyzed; and generating a variable list based on an analyzing result.

2. The comprehensive management method for application traffic according to claim 1, wherein the marking, by a user terminal, a traffic request with a label comprises:

embedding an SDK in a browser and an application program of the user terminal, and adding a Trace ID header to each of traffic requests of the browser and the application program of the user terminal by using the embedded SDK.

3. The comprehensive management method for application traffic according to claim 1, wherein the identifying and filtering the traffic request based on the traffic filtering rule comprises:

performing calculation and determination on information in a variable list based on the traffic filtering rule to obtain a next-step processing rule for the traffic request.

4. The comprehensive management method for application traffic according to claim 1, wherein the performing, by the application proxy gateway, an in-traffic proxy comprises:

performing protocol analyzing on a traffic forwarded by the user access layer gateway or a traffic remotely invoked by an application, performing traffic limiting, degradation or fusing on the traffic based on a protocol analyzing result, and forwarding the traffic after traffic limiting, degradation or fusing to an application program.

5. The comprehensive management method for application traffic according to claim 1, wherein the performing, by the application proxy gateway, an out-traffic proxy comprises:

performing protocol analyzing on a call by an application program to another application or on an external call by an application program, performing traffic limiting, degradation or fusing on a traffic based on a protocol analyzing result, and forwarding the traffic after traffic limiting, degradation or fusing to an internal proxy gateway, a database, a cache or an external call.

6. The comprehensive management method for application traffic according to claim 1, wherein the traffic processing rule comprises: a traffic security blocking rule, a traffic limiting rule, a traffic fusing rule, a traffic degradation rule, and a traffic replication rule.

7. The comprehensive management method for application traffic according to claim 6, wherein the performing processing on the traffic request comprises:

performing traffic security blocking on the traffic request based on the traffic security blocking rule, wherein the traffic security blocking comprises real-time blocking on the traffic request.

8. The comprehensive management method for application traffic according to claim 6, wherein the performing processing on the traffic request based on the traffic processing rule comprises:

performing traffic limiting on the traffic request at a dimension based on the traffic limiting rule.

9. The comprehensive management method for application traffic according to claim 6, wherein the performing processing on the traffic request based on the traffic processing rule comprises:

performing fusing on a traffic request meeting a condition based on the traffic fusing rule.

10. The comprehensive management method for application traffic according to claim 6, wherein the performing processing on the traffic request based on the traffic processing rule comprises:

performing replication and simulation on the traffic request based on the traffic replication rule, wherein the replication and simulation is performed by replicating the traffic request and forwarding the replicated traffic request to a bypass proxy gateway.

11. An electric device, comprising: a memory, storing at least computer-executable instructions; and a processor; wherein:

the processor is configured to, when executing the computer-executable instructions stored in the memory, perform the comprehensive management method for application traffic according to claim 1.

12. A computer-readable storage medium, storing computer-executable instructions, wherein the computer-executable instructions, when executed by a processor, cause the processor to perform the comprehensive management method for application traffic according to claim 1.

* * * * *